(12) United States Patent
Bonanno et al.

(10) Patent No.: US 10,691,460 B2
(45) Date of Patent: Jun. 23, 2020

(54) POINTER ASSOCIATED BRANCH LINE JUMPS FOR ACCELERATED LINE JUMPS

(71) Applicant: International Business Machines Corporation, Armonk, NY (US)

(72) Inventors: James J. Bonanno, Wappingers Falls, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 15/377,420

(22) Filed: Dec. 13, 2016

(65) Prior Publication Data

US 2018/0165095 A1  Jun. 14, 2018

(51) Int. Cl.
  *G06F 9/38* (2018.01)
  *G06F 12/0862* (2016.01)
  *G06F 12/0875* (2016.01)

(52) U.S. Cl.
  CPC .......... *G06F 9/3806* (2013.01); *G06F 9/3844* (2013.01); *G06F 12/0862* (2013.01); *G06F 12/0875* (2013.01); *G06F 2212/452* (2013.01); *G06F 2212/602* (2013.01)

(58) Field of Classification Search
  None
  See application file for complete search history.

(56) References Cited

U.S. PATENT DOCUMENTS

| | | | |
|---|---|---|---|
| 5,507,028 A * | 4/1996 | Liu | G06F 9/3806 712/207 |
| 6,721,877 B1 * | 4/2004 | Chen | G06F 9/3806 712/239 |
| 7,082,520 B2 | 7/2006 | Bonanno et al. | |
| 7,398,377 B2 | 7/2008 | McDonald et al. | |
| 7,493,480 B2 | 2/2009 | Emma et al. | |
| 8,473,711 B2 * | 6/2013 | Chang | G06F 12/0862 711/204 |
| 8,909,907 B2 | 12/2014 | Bonanno et al. | |

(Continued)

OTHER PUBLICATIONS

Alexander V. Veidenbaum; "Instruction Cache Prefetching Using Multilevel Branch Prediction"; Proceedings of the International Symposium on High-Performance Computing; Nov. 1997; 1-19 pages.

(Continued)

*Primary Examiner* — George Giroux
(74) *Attorney, Agent, or Firm* — Cantor Colburn LLP; William Kinnaman (57) ABSTRACT

A method includes a processor providing at least one line entry address tag in each line of a branch predictor; indexing into the branch predictor with a current line address to predict a taken branch's target address and a next line address; re-indexing into the branch predictor with one of a predicted next line address or a sequential next line address when the at least one line entry address tag does not match the current line address; using branch prediction content compared against a search address to predict a direction and targets of branches and determining when a new line address is generated; and re-indexing into the branch predictor with a corrected next line address when it is determined that one of the predicted next line address or the sequential next line address differs from the new line address.

14 Claims, 7 Drawing Sheets

(56) References Cited

U.S. PATENT DOCUMENTS

| | | |
|---|---|---|
| 9,146,739 B2 | 9/2015 | Bonanno et al. |
| 9,250,912 B2 | 2/2016 | Bonanno et al. |
| 2003/0079088 A1* | 4/2003 | Malik .................. G06F 12/0862 711/137 |
| 2003/0182543 A1* | 9/2003 | Keller .................. G06F 9/30149 712/237 |
| 2004/0015683 A1* | 1/2004 | Emma .................. G06F 9/3806 712/240 |
| 2005/0182907 A1* | 8/2005 | Shen .................. G06F 12/0831 711/146 |
| 2005/0210198 A1* | 9/2005 | Dimpsey .............. G06F 9/30181 711/137 |
| 2011/0093658 A1 | 4/2011 | Zuraski, Jr. et al. |
| 2012/0084497 A1* | 4/2012 | Subramaniam ....... G06F 9/3816 711/105 |
| 2013/0332713 A1* | 12/2013 | Bonanno ............... G06F 9/3806 712/239 |
| 2013/0339694 A1 | 12/2013 | Bonanno et al. |
| 2014/0164748 A1 | 6/2014 | Dundas |
| 2016/0132331 A1* | 5/2016 | Godard ................. G06F 9/3806 711/137 |
| 2016/0239309 A1 | 8/2016 | Bonanno et al. |
| 2017/0371790 A1* | 12/2017 | Dwiel ................. G06F 12/0811 |

OTHER PUBLICATIONS

I-Cheng K. Chen, et al; Instruction Prefetching Using Branch Prediction Information; Proceedings of the International Conference on Computer Design; Oct. 1997; 1-10 pages.

Lawrence Spracklen et al; "Effective Instruction Prefetching in Chip Multiprocessors for Modern Commercial Applications"; Proceedings of the 11th International Symposium on High-Performance Computer Architecture, Feb. 2005; 1-12 pages.

Viji Srinivasan, et al; "Branch History Guided Instruction Prefetching"; Proceedings of the 7th International Symposium on High-Performance Computer Architecture; Jan. 2001; 291-300 pages.

Ferdman et al.; "Proactive Instruction Fetch"; MICRO'11, Dec. 3-7, 2011, Porto Alegre, Brazil; 11 pages.

Ferdman et al.; "Temporal Instruction Fetch Streaming"; Proceedings of the 41st Annual IEEE/ACM Int'l Symposium on Microarchitecture, 2008; 10 pages.

Reinman et al.; "Fetch Directed Instruction Prefetching"; In Proceedings of the 32nd Annual International Symposium on Microarchitecture (MICRO-32), Nov. 1999; 12 pages.

* cited by examiner

POINTER ASSOCIATED BRANCH LINE JUMPS FOR ACCELERATED LINE JUMPS

BACKGROUND

The present disclosure relates to computer processing systems, and more specifically, to methods, systems and computer program products for pointer-associated branch line jumps for accelerated line jumps.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target address of a taken conditional or unconditional branch before it is computed by decoding and executing the instruction itself. A branch target may be a computed address based on an offset from the branch address or an indirect reference through a register.

A branch target buffer is a type of branch predictor that can be used to predict the target of a predicted taken branch instruction based on the address of the branch instruction. Predicting the target of the branch instruction can prevent pipeline stalls by not waiting for the branch instruction to reach the target computation stage of the pipeline to compute the branch target address. By performing branch target prediction, the branch's target instruction decode may be performed as early as in the same cycle or the cycle after the branch instruction instead of having multiple empty cycles between the branch instruction and the target of the predicted taken branch instruction.

SUMMARY

According to one or more embodiments of the present invention, a computer implemented method includes providing, by a processor, at least one line entry address tag in each line of a branch predictor; indexing, by the processor, into the branch predictor with a current line address to predict a taken branch's target address and a next line address, wherein the at least one line entry address tag is utilized when indexing into the branch predictor with a current line address to predict a next line address when the at least one line entry address tag matches the current line address; re-indexing, by the processor, into the branch predictor with one of a predicted next line address or a sequential next line address when the at least one line entry address tag does not match the current line address; using, by the processor, branch prediction content compared against a search address to predict a direction and targets of branches and determining when a new line address is generated; and re-indexing, by the processor, into the branch predictor with a corrected next line address when it is determined that one of the predicted next line address or the sequential next line address differs from the new line address.

According to another embodiment of the present invention, a system includes a processor in communication with one or more types of memory, the processor configured to provide at least one line entry address tag in each line of a branch predictor; to index into the branch predictor with a current line address to predict a taken branch's target address and a next line address, wherein the at least one line entry address tag is utilized when indexing into the branch predictor with a current line address to predict a next line address when the at least one line entry address tag matches the current line address; to re-index into the branch predictor with one of a predicted next line address or a sequential next line address when the at least one line entry address tag does not match the current line address; to use branch prediction content compared against a search address to predict a direction and targets of branches and determining when a new line address is generated; and to re-index into the branch predictor with a corrected next line address when it is determined that one of the predicted next line address or the sequential next line address differs from the new line address.

According to yet another embodiment of the present invention, a computer program product includes a non-transitory storage medium readable by a processing circuit and storing instructions for execution by the processing circuit for performing a method that includes providing at least one line entry address tag in each line of a branch predictor; indexing into the branch predictor with a current line address to predict a taken branch's target address and a next line address, wherein the at least one line entry address tag is utilized when indexing into the branch predictor with a current line address to predict a next line address when the at least one line entry address tag matches the current line address; re-indexing into the branch predictor with one of a predicted next line address or a sequential next line address when the at least one line entry address tag does not match the current line address; using branch prediction content compared against a search address to predict a direction and targets of branches and determining when a new line address is generated; and re-indexing into the branch predictor with a corrected next line address when it is determined that one of the predicted next line address or the sequential next line address differs from the new line address.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The methods, systems and computer program products described herein are directed to pipeline types of processors having a branch predictor or branch prediction logic (BPL). In exemplary embodiments, the BPL may include a prediction table such as a branch target buffer (BTB) structure, along with a number of other structures and buffers to support branch direction prediction and branch target address prediction within the processor. The BTB may comprise a hierarchical or multi-level BTB (i.e., first level BTB1, second level BTB2). A hierarchical BTB generally refers to a BTB having multiple tables where typically the second level table is larger than the first level table. The trade-off is that the second level table is usually slower than the first level table. There may be other differences between the first and second level tables.

In asynchronous branch prediction, the BTB may be searched in parallel and independently from instruction fetching to find upcoming branches. In synchronous branch prediction, the BTB may be accessed simultaneously with or after fetching instructions and determining instruction boundaries to provide a prediction for each encountered branch instruction. In either design implementation, performance benefits of the BTB are a function of the accuracy of the prediction provided from the BTB, a function of the capacity of the BTB, and the latency required to access the BTB.

A larger BTB may provide relatively better prediction coverage than a smaller BTB because it may store information about more branch instructions. However, a larger BTB typically has a longer latency than a smaller BTB. A relatively large BTB may be implemented with one or more large static random access memory (SRAM) arrays or eDRAM (for greater density over SRAM). Such large SRAM arrays may have a limited number of read and write ports (e.g., only 1 or 2) and have restrictions such that it may not be possible to both read and write to the same bank of the SRAM array in the same cycle. A relatively small BTB may be implemented with one or more small SRAM register files. SRAM register files may be more flexible in providing multiple read and write ports. However, multi-ported register files may be less dense than SRAM arrays, making multi-ported register files infeasible to implement a sufficiently large BTB to provide adequate performance, especially in commercial workloads with large instruction (and therefore branch) footprints.

In some embodiments, a hierarchical BTB may have a goal to store the branches in the BTB2 (and beyond) in as little space as possible for each branch. Through compacting as many branches as possible in an associated tag for a region of address space, greater efficiency may be achieved. For the BTB1, advantages may include a more efficient search rate measured in line size, branches, code region searched per cycle, and/or install rate from the BTB2. For the BTB2, advantages may include power, an increased capacity per unit of area and a more efficient transfer rate back to the BTB1.

In designing a BTB, the amount of branches that can be stored in the BTB is part of the equation that determines how beneficial the BTB structure is. In general, a BTB is indexed by part of an instruction address within the processor, and tag bits are stored in the BTB such that the more significant tag bits must match the remaining address bits of concern, that is, address bits, that were not used for the indexing. To improve the efficiency of the BTB, the BTB can be created such that it has an associativity greater than one. By creating an associativity greater than one, multiple branch/target pairs can be stored for a given index into the BTB array. To determine which are the correct entries (if an entry at all), the tag bits are used to select zero or more, entries from the multiple entries stored for a given index.

For example, if the line size is 128 bytes, then the index bits could be as large as 0:56, given bit 0 is the most significant bit (MSB) and bit 63 is the least significant bit (LSB) for a 64-bit value, which is an example of big-endian format. This table would be so large as to be un-buildable. As such, indexing may only be ten bits 47:56 (e.g., to create a 1 k deep table). The tag could be 0:46 or, for efficiency, a smaller tag such as 32:46. A smaller tag would yield aliasing that may create a false prediction.

There are also tag bits 57:63 denoted with each branch in the BTB. These are to distinguish it from other branches within the line. In the case of starting at searching for a branch at point Y within the line, the taken branch of interest is either at or after the Y offset within the line. In other words, the tag 32:46 must match. However, the tag of 57:63 is not necessarily a direct match when searching, for example, the first taken branch within a line.

The branch target may be located relatively close to the branch, possibly the branch itself, or somewhere far away from the address of the branch. The closer a branch is to its target, the more likely it is for a branch address tag and a target address to have equal address bits throughout some portion of the higher address bits. This is because software programs, while being potentially very large in size, use a divide and conquer method in the way they are written. Different sections of code may be used for different operations of a program. Within the smaller segments there are many relatively local branches and there exist few branches that go between the different segments of the program. Within the smaller segments, branch and target addresses are more likely to be close together and therefore have more bits in common than those branches which branch further distances.

Figure 1:
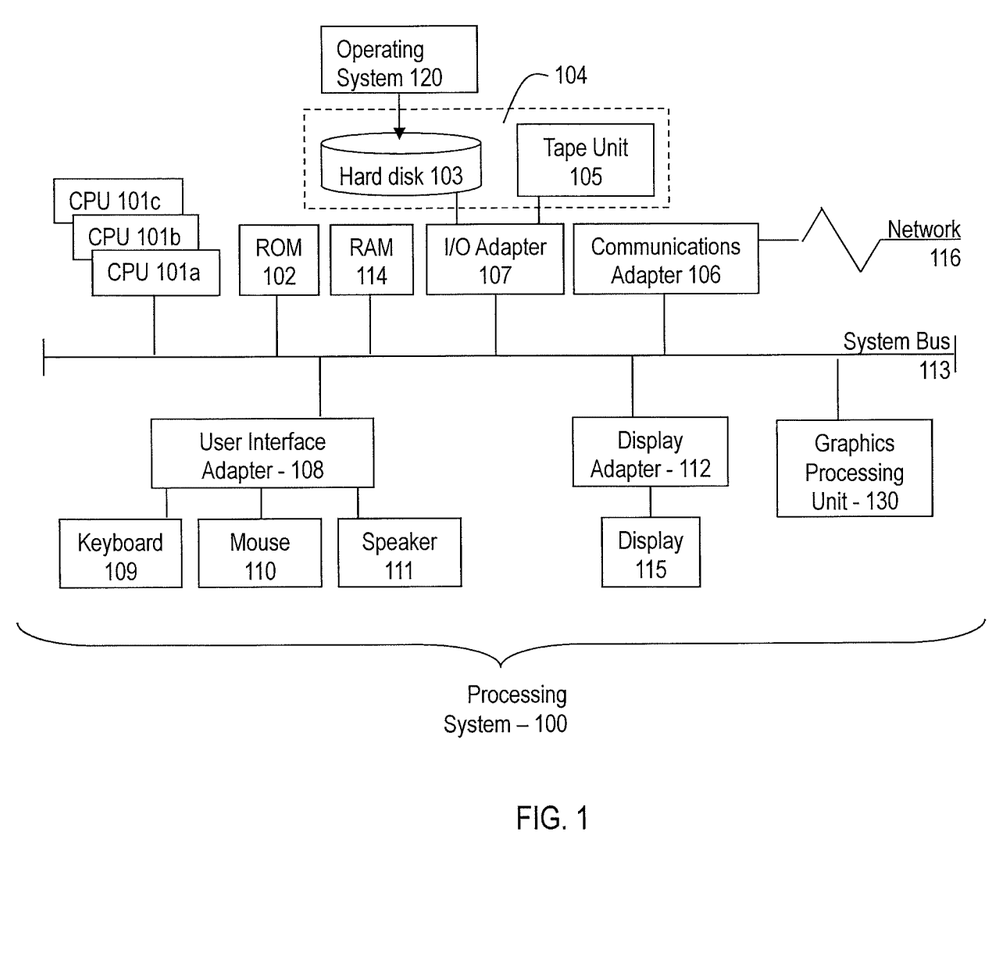
FIG. 1 is a block diagram illustrating one example of a processing system for practice of the teachings herein.

Referring to FIG. 1, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
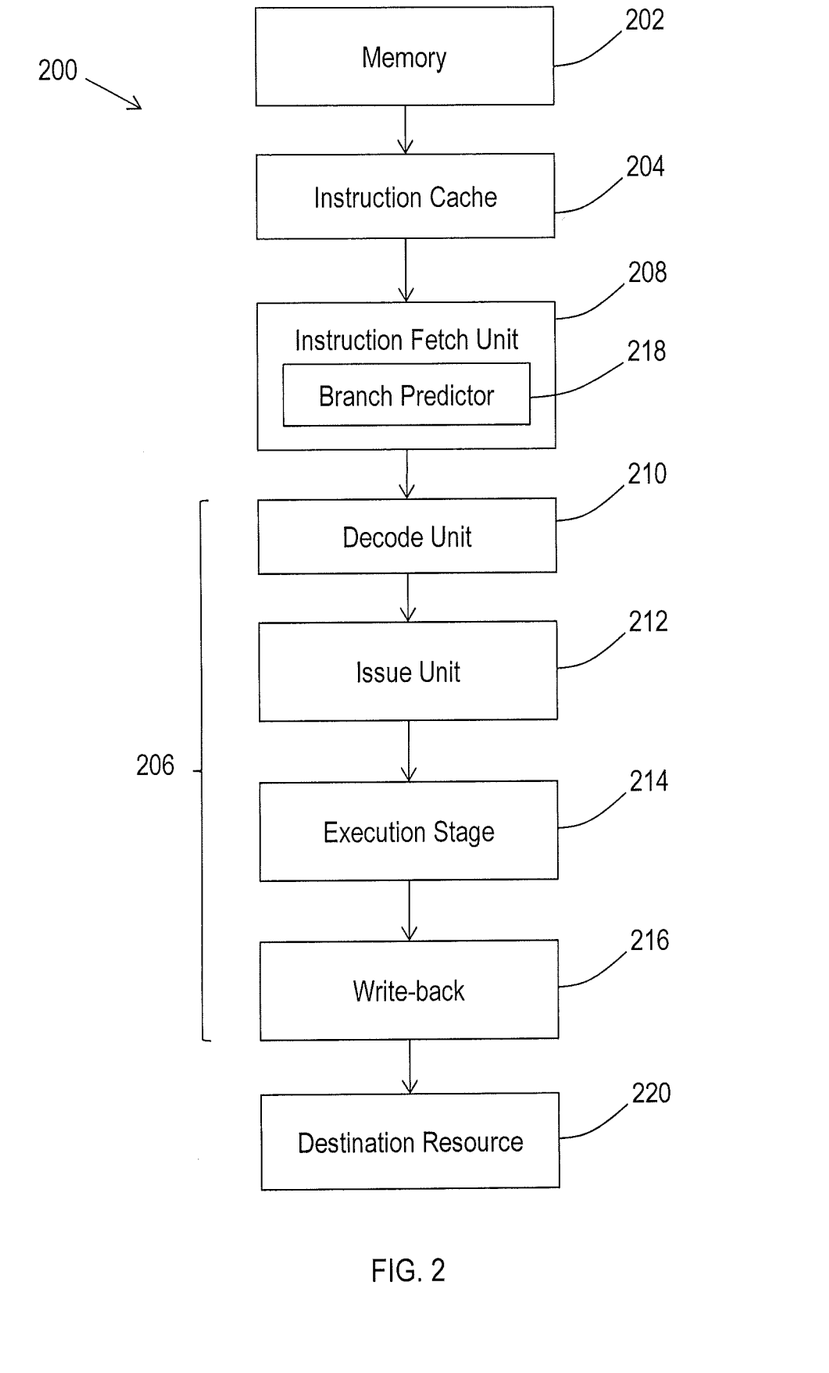
FIG. 2 is a block diagram illustrating an example of a processing system according to embodiments of the present invention.

Referring to FIG. 2, there illustrated is a block diagram of a processing system 200 according to an embodiment. The processing system 200 may include a memory 202, an instruction cache (I-cache) 204, an instruction fetch (I-fetch) unit 208, a branch predictor 218, and a processing pipeline 206. The processing pipeline 206 may include a decode unit 210, an issue unit 212, an execution stage 214, and/or a write-back logic unit 216. The processing system 200 may be included within a computer processor, or be a part of or otherwise be distributed within a computer system such as, for example, the processing system 100 shown in FIG. 1 and described hereinabove. Instructions and data may be stored in memory 202, and the I-cache 204 may access instructions in memory 202 and store the instructions to be fetched. The memory 202 may include any type of volatile or non-volatile memory, such as cache memory. The memory 202 and I-cache 204 may include multiple cache levels. A data cache (not depicted) may also be included in the processing system 200.

In FIG. 2, the processing system 200 may further include multiple processing pipelines 206 and I-fetch units 208. The entire I-fetch unit 208 or the branch predictor 218 may also be part of the processing pipeline 206. The processing pipeline 206 may include other features, such as error checking and handling logic, one or more parallel paths through the processing pipeline 206, and other features known in the art. While a forward path through the processing system 200 is shown in FIG. 2, other feedback and signaling paths may be included between elements of the processing system 200.

The I-fetch unit 208 may fetch instructions from the I-cache 204 for further processing by the decode unit 210. In some embodiments, the I-fetch unit 208 may include a branch predictor 218. Alternatively, the branch predictor 218 may be located separately from the I-fetch unit 208. The I-fetch unit 208 can also include other branch prediction logic (not depicted). The branch predictor 218 is an example of a processing circuit to implement asynchronous hierarchical branch prediction using a second-level branch target buffer (BTB2).

The decode unit 210 may decode instructions and pass the decoded instructions, portions of instructions, or other decoded data to the issue unit 212. The issue unit 212 may analyze the instructions or other data and transmit the decoded instructions, portions of instructions, or other data to one or more execution units in the execution stage 214 based on the analysis. The execution stage 214 may execute the instructions. The execution stage 214 may include a plurality of execution units, such as fixed-point execution units, floating-point execution units, load/store execution units, and vector execution units. The write-back logic 216 may write results of instruction execution back to a destination resource 220. The destination resource 220 may be any type of resource, including registers, cache memory, other memory, I/O circuitry to communicate with other devices, other processing circuits, or any other type of destination for executed instructions or data.

Asynchronous branch prediction has the ability to get ahead in time of fetching instructions from the I-cache in order to hide I-cache misses with regard to the line of interest. However, this can be slowed down by a looping branch staying within the same cache line. A looping branch can still have the branch prediction logic get ahead of the instruction fetching, but it is potentially getting ahead all within the same line and slowly getting ahead to find a potential future cache miss.

Also, a branch staying within the same BTB search line can slow down the BTB from indexing the next congruence class to be searched. A taken branch to a different line address may map to the same congruence class within the BTB. Depending upon the design, the BTB may or may not have to be indexed for such. Embodiments of the present invention represent improvements in these areas of a pipeline processor.

Figure 3:
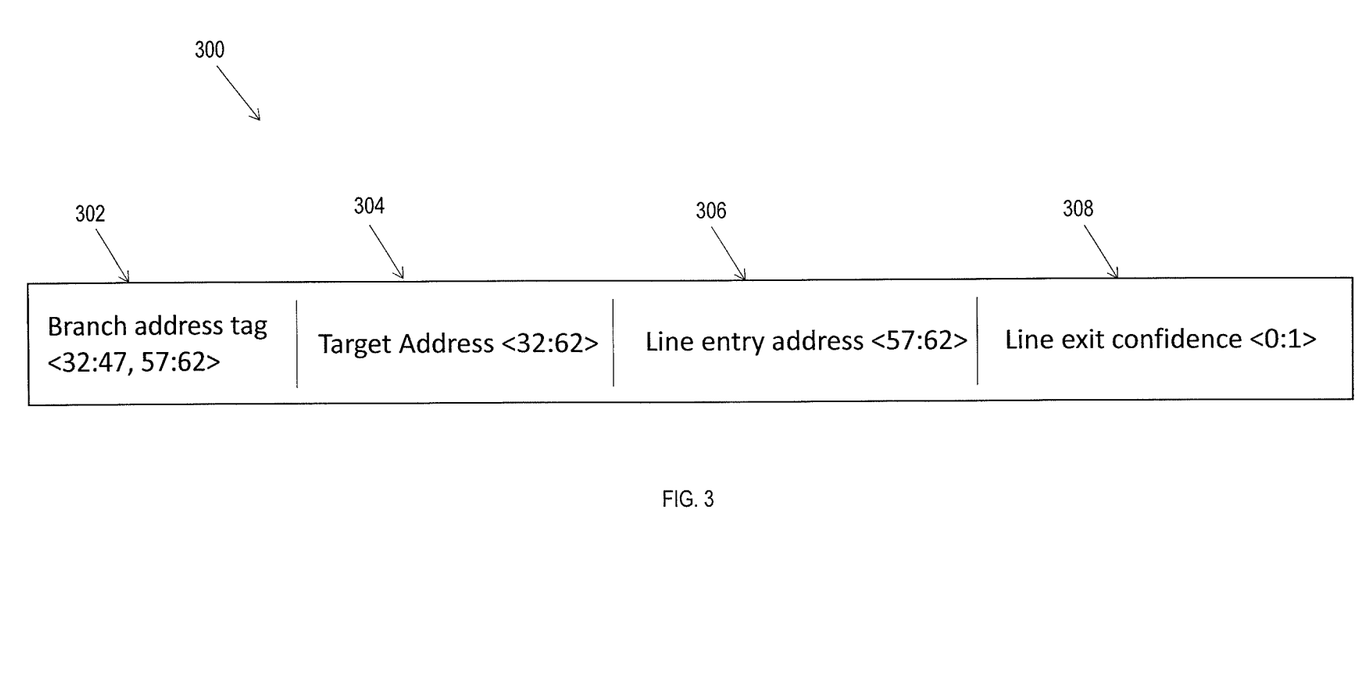
FIG. 3 illustrates an example of a line in a branch target buffer having one or more additional entries according to embodiments of the present invention.

Referring now to FIG. 3, there illustrated is an example of a line 300 in a branch predictor or prediction table such as a branch target buffer (e.g., BTB 404 in FIG. 4), wherein the line 300 has one or more additional entries 306, 308, according to embodiments of the present invention. The BTB may be a part of the branch predictor 218 shown in FIG. 2, which is a part of the processing system 200 illustrated there. In this example, the BTB line entry 300 shown in FIG. 3 is 61 bits long and includes the standard branch address tag or field 302 (here, comprising bits 32 through 47, and bits 57 through 62), along with the standard branch target address tag or field 304 (here, bits 32 through 62). In embodiments of the present invention, the entry 300 in the BTB has two added tags or fields: a line entry address tag or field 306 (here, bits 57 through 62), and a line exit confidence tag or field 308 (here, bits 0 and 1).

In an example of using a BTB congruence class (i.e., BTB row) that is the same size as the I-cache line size, both the I-cache prefetching and the BTB congruence class indexing can be accelerated, in accordance with embodiments of the present invention. However, the BTB congruence class and the I-cache line size may differ and still benefit from acceleration advantages, in accordance with other embodiments of the present invention. If the I-cache line is smaller than the BTB congruence class, the information provided by the branch line exit address would not be enough to cover all lines of the I-cache of interest. However, the BTB may provide knowledge that the smaller sequential I-cache line(s) should also be fetched. In such cases, the BTB could work on a smaller I-cache line size. On the other hand, if the I-cache line size is larger than the BTB congruence class, the BTB exit line target prediction would be an exit line for the BTB but potentially not for the I-cache. As such, while this will still accelerate I-cache unique line references for instruction fetching, it would not accelerate them as much for the BTB and the I-cache being the same larger size.

For each branch in the BTB, there are certain branches within a congruence class that have a target address that redirects to a different congruence class. With those branches that redirect to a different congruence class, the additional line entry address tag or field 306 may be kept in addition to the branch instruction address tag 302 and the target address tag 304. This additional tag or field 306 is the line or congruence class entry point offset.

Also in accordance with embodiments of the present invention, when predicting into a new congruence class, one can go beyond looking for the classical first next branch. When entering a line to look for the classical first next branch, the line is not always entered at the "far left" (i.e., an offset of '0'). For example, a restart or taken branch could redirect to the middle of a BTB line. The first taken branch of interest will be a predicted taken branch that is at or after this restart point where it is the first taken branch to be encountered at or after the starting point.

Also, one can look for the branch that has an entry point tag that matches the entry point into the current congruence class. This represents the branch that will be predicted to exit the line. The exit target address of the line is the target address of the branch that is stored in this entry of the BTB—i.e., the target address 32:62 (304). The branch is predicted to exit the line, but not necessarily the congruence class. The exit taken branch will be to a different line, which line could be to the same congruence class that the BTB is currently referencing.

Upon associating the branch that will exit a congruence class upon being associated with the congruence class entry point, this exit point is used to steer both the instruction cache prefetching (i.e., which line to fetch next) and the BTB indexing to index the next congruence class of interest to BTB branch searching.

Multiple predictions, taken and not taken, can be made from the existing congruence class of searching. For example, given a for loop in a BTB congruence class, many predictions can be made, once per cycle, to reference the taken prediction for each iteration of the loop. While these predictions are being made, the next line or congruence class of the BTB can be accessed.

Upon finding the branch that leaves the line, if the redirect matches the predicted congruence class jump, then the next congruence class is available for quick searching. If the for loop (aka generic line) exit redirect to another line does not match the accelerated redirect, the accelerated redirect is ignored and the BTB is re-indexed for the for loop (aka generic line) exit associated congruence class redirect. No overhead cycles are paid for the additional redirect, just an opportunity cost for not getting a jump on the congruence class redirect.

In embodiments of the present invention, the line exit confidence tag or field 308 may act as a confidence counter, whose value may be adjusted based on whether or not the predicted next line address matches the new line address from a branch prediction search process, and wherein a line exit prediction is performed when the confidence counter is above a threshold value.

Embodiments of the present invention define new content (i.e., the tags or fields 306, 308) within each line in a multi-level or hierarchical BTB. They also define how to leverage to reduce array power-up in the level one BTB (BTB1) and in the I-fetch cache (e.g., being able to I-fetch the next cache line faster), and prefetching in the level two BTB (BTB2) and in the level two I-fetch cache. The prefetching as discussed hereinafter for the I-cache (which also applies to the BTB) is that by searching for the next line of interest per the next line predictor, the design is prefetching ahead.

As for I-cache power savings, by doing the prefetch, to determine if a TLB/DIR (Translation Lookaside Buffer/ Directory) hit, if a hit (or a miss and then install), the set/way of the I-cache that contains the I-txt can be remembered such that upon I-fetching for the I-txt the set of interest is known. (All sets/ways in the I-cache congruence class do not have to all be powered up in parallel with a TLB/DIR access and then later select the set of interest from the I-cache).

As for the BTB, this would require further knowledge, one can expand to additionally track the ways/sets of the BTB that should be powered up in the next line with the next line target predictor.

Figure 4:
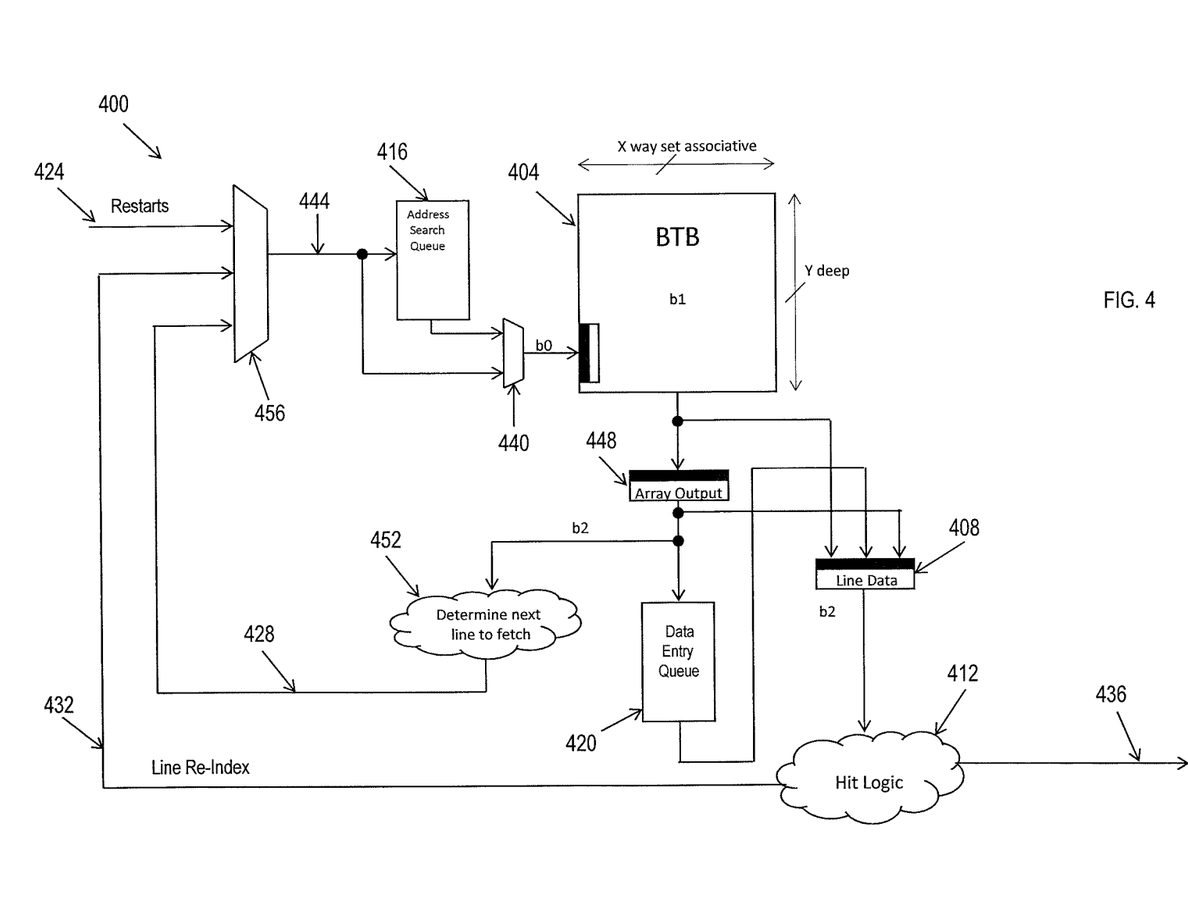
FIG. 4 is a block diagram of branch prediction logic according to embodiments of the present invention.

Referring now to FIG. 4, there illustrated is a detailed block diagram of branch prediction logic 400, which may be a part of the branch predictor 218 of FIG. 2. According to embodiments of the present invention, the branch prediction logic 400 includes a branch target buffer (BTB) 404, which contains a number of rows (congruence classes) and columns. When the BTB 404 is at the end of a searching or indexing cycle, the output of the BTB 404 is latched by the line data latch 408. This latch 408 contains all of the branch data content from the BTB 404 within the then-current BTB line that was searched or indexed. This branch content data is held in the latch 408 as long as branches are branching (i.e., being taken) within any one BTB line.

The branch prediction logic 400 also includes hit logic 412, which not only finds the taken branch of interest (if any), but if a branch is taken and leaves the current search line, the hit logic 412 determines if the exit matches the exit point as a function of where the current search line was entered, using the line entry address tag or field 306. If these match, the line entry tag or field 306 in the current line being searched or indexed is maintained and is used to predict the next line address.

If these do not match, then the search address queue 416 and the data entry queue 420 both need to be reset and searching is restarted or re-indexed as a function of the hit logic taken target address 432 that leaves the line. If a taken branch is not found within the line but a given branch was used as the exit point, then one has the defined reset condition. The hit logic 412 will say there is no taken branch, and searching needs to continue on the sequential line. Therefore, the BTB 404 will be restarted or re-indexed as per the line re-index 432 with the sequential line address.

The search address queue 416 receives the restart address 424, the next line to prefetch 428, and the predicted target 432 when the target leaves the line (and does not match the next line to prefetch target). The output of the hit logic 412 is a signal 436 indicative of the predicted target address and the associated branch target address which is leveraged by instruction fetching.

FIG. 4 also shows the dataflow for indexing into the BTB 404 and the flow of processing the data. On a restart event (e.g., branch wrong, some other pipeline flush event, surprise taken branch, etc.), a restart address 424 is sent to the BTB 404 as per the bypass multiplexer (mux) 456 and the mux 440 around the address search queue 416. The address search queue 416 also acquires the search address 444. The output of the BTB array 404 goes to two locations: an array output latch 448 and the line data latch 408. The output of the array output latch 448 is fed to "Determine next line to fetch" logic 452 and also to the data entry queue 420. The "Determine next line to fetch" logic 452 determines if there is a target address associated with where the line was entered and uses that target for re-indexing the BTB 404 as per the multiplexer 456.

The line data latch 408 output is searched as per the hit logic 412 for the first taken branch within the line being searched. If the branch target is within the same cache line, there is no need to re-index the BTB 404 because the line output content is already in the line data latch 408. The BTB 404 will be searched or indexed again as a function of the predicted taken target address. While the line data latch 408 is holding its content, the BTB 404 may be searching ahead as per the "Determine next line to fetch" logic 452. The output content from the BTB 404 is written into the data entry queue 420, which holds the array output until the line data latch 408 is done processing the current line. The BTB 404 can get as far ahead in searching until the data entry queue 420 is full.

When the data entry queue 420 is full, the BTB 404 may still be allowed to run ahead to generate further target lines. However, being there is no room to save the data, such searches will later have to be repeated when room in the data entry queue 420 becomes available. As such, an oldest entry from the data entry queue 420 may be removed when a new line address is generated. When an exit branch is not found at all, the BTB 404 will then setup to search the next sequential line for branches. Also, directions and targets of branches may be predicted based on a current search address and content in an oldest entry in the data entry queue.

Further, the search address may be updated based on the predicted target address of a predicted taken branch, and the search address may be updated to be a sequential line address when no predicted taken branches are found. Still further, a new line address may be generated when the updated search address is in a different line than the current search address.

In various other embodiments of the present invention, instead of branch prediction logic, other "structures" may be utilized in light of the teachings herein, such as, for example, an instruction cache hierarchy or a metadata cache. The instruction cache hierarchy may comprise a conglomerate of the L1 cache, the L2 cache, etc. As such, a re-index line address may be used to prefetch instructions into an instruction cache hierarchy, or to prefetch metadata from a metadata cache.

Figure 5:
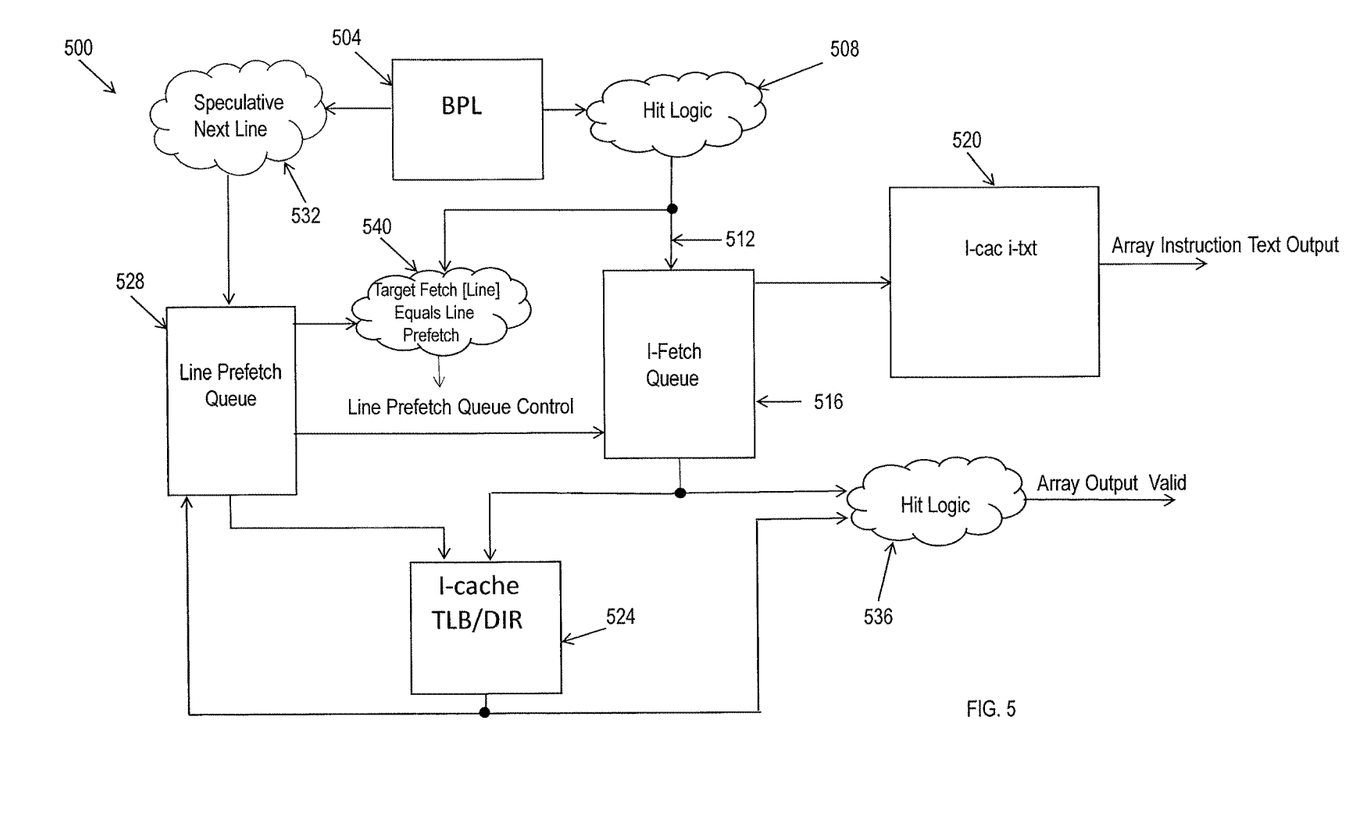
FIG. 5 is a block diagram of instruction fetch address selection logic according to embodiments of the present invention.

Referring now to FIG. 5, there illustrated is a detailed block diagram of instruction address fetch selection logic 500, which may be a part of the branch predictor 218 of FIG. 2. The instruction address fetch selection logic 500 may include a branch prediction logic (BPL) unit 504 that provides a predicted target address to first hit logic 508. The output of the first hit logic 508 is a predicted branch target and associated branch target address on a line 512 to an instruction fetch (I-fetch) queue 516.

An output from the instruction cache (I-cache) 520 may, for example, comprise 16 or 32 bytes of instruction text (I-txt) which feeds the decode unit 210 (FIG. 2). As such, the fetch queue 516 makes fetches for 16 or 32 bytes of I-txt per cycle. The fetch queue 516 also access the I-cache directory and TLB 524 to determine if a hit exists.

In a BPL speculative line prefetch, the next line that is being targeted is predicted independent of taken branches that stay within the search line. A line prefetch queue 528 fetches the lines to the I-cache 520. If the cache line is in the L1 I-cache 520, then operation is normal, which may be denoted as a hit along with tracking the way/column within the I-cache 520 that contains the I-txt of interest. If the line is not in the I-cache 520, then fetch out to the second level cache L2 and beyond as needed. The line prefetch queue 528 may inform the fetch queue 516 such that the I-cache directory and TLB 524 does not have to be accessed again for a demand fetch if the prefetch has already found the line in the cache.

The target of the first hit logic 508 is checked for validation in the logic 540. The logic 540 performs a compare to the associated entry in the line prefetch queue 528 only if the target leaves the line. If the target stays within the same line, a compare is not performed. If a match does not exist, then the line prefetch queue 528 is down the wrong path and the queue 528 needs to be reset. However, there may not always be an entry in the line prefetch queue 528. For example, if the line exit has low confidence or there are multiple line exit predictions, then there is no line exit prediction for a target line redirect. If there is not an entry in the line prefetch queue 528, this is treated the same as though the compare is not equivalent. In implementation, the flushing of an empty queue is the same as not flushing. Thus, flushing in theory becomes optional as the outcome is the same.

If the BPL 504 does not find a [taken] branch that exists in the given line (X), the BTB within the BPL 504 may then search line X+1. The speculative line knowledge from the BPL 504 to the line prefetch queue 528 is aware of the additional line crossing and informs the line prefetch queue 528 of this such that line X+1 is also prefetched.

FIG. 5 defines the instruction fetching flow for instruction text (I-txt) output from the I-cache array 520 to be sent to the decode unit 210 (FIG. 2). FIG. 5 illustrates the path that branch prediction maintains for instruction fetching. Not shown are other paths of instruction fetching into the I-cache 520. A mux may be added in front of the I-cache array 520 to represent other paths that could be making I-fetches.

As per FIG. 4, the branch prediction logic 504 can predict the next taken branch's target address and can predict the next line that will be evaluated/I-fetched. The line prefetch queue 528 acquires the next lines as per the BPL speculative next line prediction logic 532. This will access the I-cache TLB/DIR 524 to determine if the line is in the L1 I-cache. If the line is not in the L1 I-cache, a fetch will be made to the L2 I-cache (and beyond) until a hit is acquired. The data/I-txt will then be installed into the L1 I-cache 520. A path from the L2 I-cache to the L1 I-cache 520 is not shown. If a hit is acquired in the L1 or when the content is installed in the L1, the knowledge of the content being in the L1 and in which way of a multi-set associative cache will be sent to the I-fetch queue 516.

When the I-fetch queue 516 makes fetches to the I-cache 520 for instruction text, if it is not known if the content is in the L1 I-cache, then the I-cache TLB/DIR 524 must be accessed. If it is already known that the content is in the L1 I-cache and in what set, then the I-cache TLB/DIR 524 does not need to be accessed and only the way containing the instruction text in the I-cache array needs to be powered up for accessing the data/I-txt of interest.

When the BTB predicts a taken branch and that branch is found to be leaving the line, that target address is compared to that of the speculative next line address if one exists, as per tracking in the line prefetch queue 528. A speculative line may not exist for the confidence was not great enough to make a prediction or there were multiple branches whose targets were associated with the entry point into the line. In such cases, this is treated as the target addresses not matching. The hit logic 508 contains the correct speculative target, the line prefetch queue 528 is to be cleared/reset, and the process begins over with the new computed target address. For implementations that require the first line to be in the line prefetch queue 528, the speculative next line 532 will output the taken branch address of the hit logic 508 that is going to a different cache line. The I-cache array hit logic 536 states if the information from the I-cache array output is valid or not.

Figure 6:
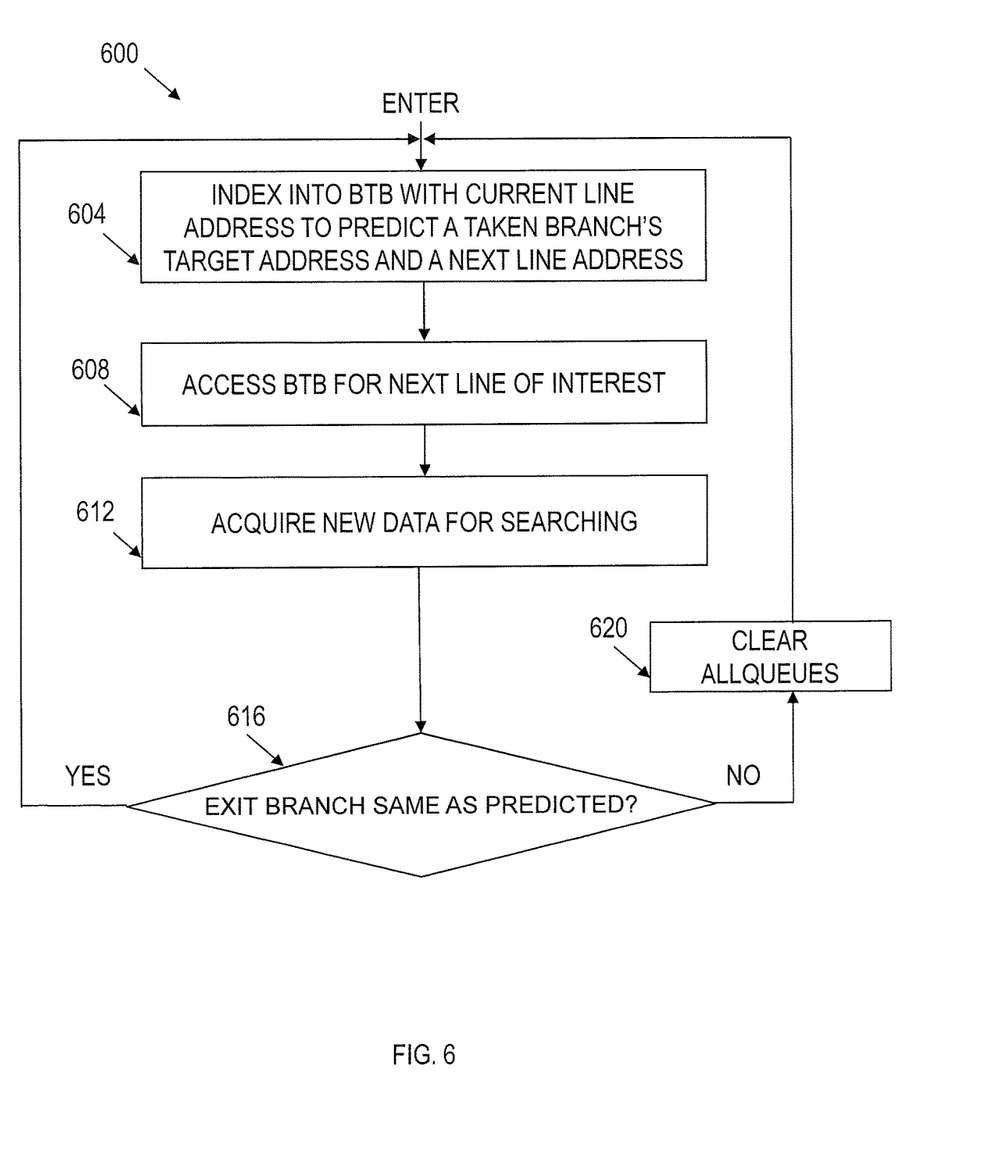
FIG. 6 is a flow diagram of a method for searching a branch predictor for address prediction according to embodiments of the present invention.

Referring to FIG. 6, there illustrated is a flow diagram of a method 600 for searching a branch predictor, for example, a branch target buffer (BTB 404 in FIG. 4), for address prediction according to embodiments of the present invention. An operation in block 604 indexes into the BTB 404 using the current line address to predict a taken branch's target address and a next line address. These addresses may or may not be the same. This operation uses the line entry address tags or fields 306 (FIG. 3) that are provided in the lines of the BTB 404, a discussed hereinabove with respect to the exemplary BTB line 300 of FIG. 3. That is, each line in the BTB 404 has at least one line entry address tag 306.

As long as the BTB's taken target address is within the same line in the BTB 404 there is no need to re-index the BTB 404 with regard to searching for the next taken branch address. This may result from a compare operation as part of the block 604 in which it is determined that the at least one line entry address tag matches the current line address. When the at least one line entry address tag does not match the current line address, then a re-indexing operation is performed as part of the block 604 into the BTB 404 with one of a predicted next line address or a sequential next line address.

Thus, the processor uses branch prediction content compared against a search address to predict a direction and targets of branches and determining when a new line address is generated. Also, the processor re-indexes into the BTB 404 with a corrected next line address when it is determined that one of the predicted next line address or the sequential next line address differs from the new line address.

An operation in block 608 accesses the BTB 404 for the next line of interest. This is a next line predictor. The output is queued up if the BTB 404 is still processing the prior line. When the prior line is finished being searched for taken branches, an operation in block 612 acquires new data for searching either from the BTB 404 or the data entry queue 420.

Next, an operation in block 616 determines if the line exit branch is the same that is predicted as a function of the line entry point. This operation in block 616 is performed when the hit logic predicts a branch to be taken that exits the line. If it is determined that the exit branch is the same that is predicted as a function of the line entry point, then the method 600 branches back to the operation in block 604 for BTB indexing to start again as a function of the predicted taken address. If it is determined that the exit branch is not the same that is predicted as a function of the line entry point, then the speculative lines fetched (i.e., queues) are flushed in an operation in block 620 and the method 600 branches back to the operation in block 604 for BTB indexing to start again as a function of the predicted taken address. Speculative indexing continues to index the next line, the next-next line, the next-next-next line, etc.

Figure 7:
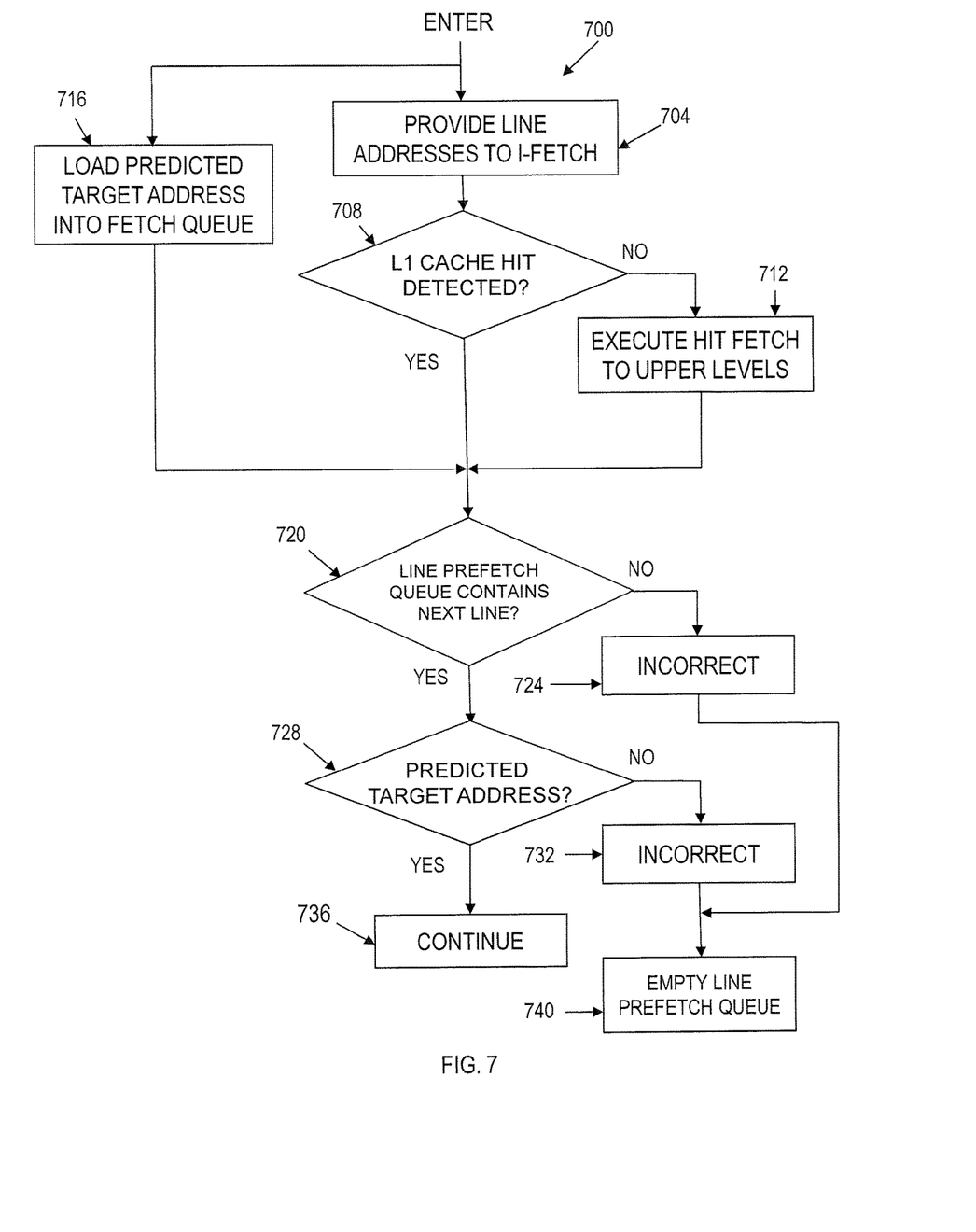
FIG. 7 is a flow diagram of a method for instruction fetch address selection according to embodiments of the present invention.

Referring to FIG. 7, there illustrated is a flow diagram of a method 700 for instruction fetch address selection according to embodiments of the present invention. In an operation in block 704, a branch predictor, such as, for example, a BTB, provides a line address to instruction fetch (I-fetch) logic. Provided are a predicted target address and a next line address (i.e., the next line speculative prediction). The predicted target address is responsible for setting the direction of fetching I-text from the I-cache followed by sending the I-txt to an instruction decoder unit.

In an operation in block 708, the speculative next line indexes a directory/TLB to determine if an L1 cache hit or match exists. If not, in an operation in block 712 a hit fetch is executed to the second level of the instruction cache and beyond as needed. An operation in block 720 then determines if a line prefetch queue entry contains a next line or not.

As a parallel path upon entering the method 700 of FIG. 7, upon a predicted target address getting into the fetch queue in an operation in block 716, the operation in block 720 determines if a line prefetch queue entry contains a next line or not. If not, an operation in block 724 treats as if wrong. If it contains an address, an operation in block 728 compares this to the predicted target address that is leaving the cache line. If there is not a match, then it is treated as incorrect in an operation in block 732. If instead there is a match, then continue in an operation in block 736. If wrong, an operation in block 740 empties or invalidates the line prefetch queue for it has gone down an unintended speculative path.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
providing, by a processor, at least one line entry address tag in each line of a branch predictor;
indexing, by the processor, into the branch predictor with a current line address to predict a taken branch's target address and a next line address, wherein the at least one line entry address tag is utilized when indexing into the branch predictor with a current line address to predict a next line address when the at least one line entry address tag matches the current line address;
re-indexing, by the processor, into the branch predictor with one of a predicted next line address or a sequential next line address when the at least one line entry address tag does not match the current line address;
using, by the processor, branch prediction content compared against a search address to predict a direction and targets of branches and determining when a new line address is generated;
re-indexing, by the processor, into the branch predictor with a corrected next line address when it is determined that one of the predicted next line address or the sequential next line address differs from the new line address; and
writing content from the branch predictor into a data entry queue, and removing an oldest entry from the data entry queue when a new line address is generated,
wherein each line of the branch predictor further comprises a confidence counter, wherein the confidence counter is adjusted based on whether the predicted next line address matches the new line address from a branch prediction search process, and wherein a line exit prediction is performed when the confidence counter is above a threshold value.

2. The computer-implemented method of claim 1 further comprising using a re-index line address to prefetch instructions into an instruction cache hierarchy and using a re-index line address to prefetch metadata from a metadata cache.

3. The computer-implemented method of claim 1 further comprising updating the search address based on the predicted target address of a predicted taken branch, and updating the search address to be a sequential line address when no predicted taken branches are found.

4. The computer-implemented method of claim 1 further comprising predicting directions and targets of branches based on a current search address and content in an oldest entry in the data entry queue.

5. The computer-implemented method of claim 1 further comprising generating a new line address when the updated search address is in a different line than the current search address.

6. A system comprising:
a processor in communication with one or more types of memory, the processor configured to:
provide at least one line entry address tag in each line of a branch predictor;
index into the branch predictor with a current line address to predict a taken branch's target address and a next line address, wherein the at least one line entry address tag is utilized when indexing into the branch predictor with a current line address to predict a next line address when the at least one line entry address tag matches the current line address;
re-index into the branch predictor with one of a predicted next line address or a sequential next line address when the at least one line entry address tag does not match the current line address;
use branch prediction content compared against a search address to predict a direction and targets of branches and determining when a new line address is generated;
re-index into the branch predictor with a corrected next line address when it is determined that one of the predicted next line address or the sequential next line address differs from the new line address; and
write content from the branch predictor into a data entry queue, and removing an oldest entry from the data entry queue when a new line address is generated,
wherein each line of the branch predictor further comprises a confidence counter, wherein the confidence counter is adjusted based on whether the predicted next line address matches the new line address from a branch prediction search process, and wherein a line exit prediction is performed when the confidence counter is above a threshold value.

7. The system of claim 6 wherein the processor is further configured to use a re-index line address to prefetch instructions into an instruction cache hierarchy and to use a re-index line address to prefetch metadata from a metadata cache.

8. The system of claim 6 wherein the processor is further configured to update the search address based on the predicted target address of a predicted taken branch, and to update the search address to be a sequential line address when no predicted taken branches are found.

9. The system of claim 6 wherein the processor is further configured to predict directions and targets of branches based on a current search address and content in an oldest entry in the data entry queue.

10. The system of claim 6 wherein the processor is further configured to generate a new line address when the updated search address is in a different line than the current search address.

11. A computer program product comprising:
a non-transitory storage medium readable by a processing circuit and storing instructions for execution by the processing circuit for performing a method comprising:
providing at least one line entry address tag in each line of a branch predictor;
indexing into the branch predictor with a current line address to predict a taken branch's target address and a next line address, wherein the at least one line entry address tag is utilized when indexing into the branch predictor with a current line address to predict a next line address when the at least one line entry address tag matches the current line address;
re-indexing into the branch predictor with one of a predicted next line address or a sequential next line address when the at least one line entry address tag does not match the current line address;

using branch prediction content compared against a search address to predict a direction and targets of branches and determining when a new line address is generated;

re-indexing into the branch predictor with a corrected next line address when it is determined that one of the predicted next line address or the sequential next line address differs from the new line address; and writing content from the branch predictor into a data entry queue, and removing an oldest entry from the data entry queue when a new line address is generated, wherein each line of the branch predictor further comprises a confidence counter, wherein the confidence counter is adjusted based on whether the predicted next line address matches the new line address from a branch prediction search process, and wherein a line exit prediction is performed when the confidence counter is above a threshold value.

12. The computer program product of claim 11 further comprising using a re-index line address to prefetch instructions into an instruction cache hierarchy and using a re-index line address to prefetch metadata from a metadata cache.

13. The computer program product of claim 11 further comprising updating the search address based on the predicted target address of a predicted taken branch, updating the search address to be a sequential line address when no predicted taken branches are found, and predicting directions and targets of branches based on a current search address and content in an oldest entry in the data entry queue.

14. The computer program product of claim 11 further comprising generating a new line address when the updated search address is in a different line than the current search address.

* * * * *